No. 632,179. Patented Aug. 29, 1899.
C. M. FLOYD.
COMBINED PLANTER AND FERTILIZER DISTRIBUTER.
(Application filed June 5, 1899.)
(No Model.)
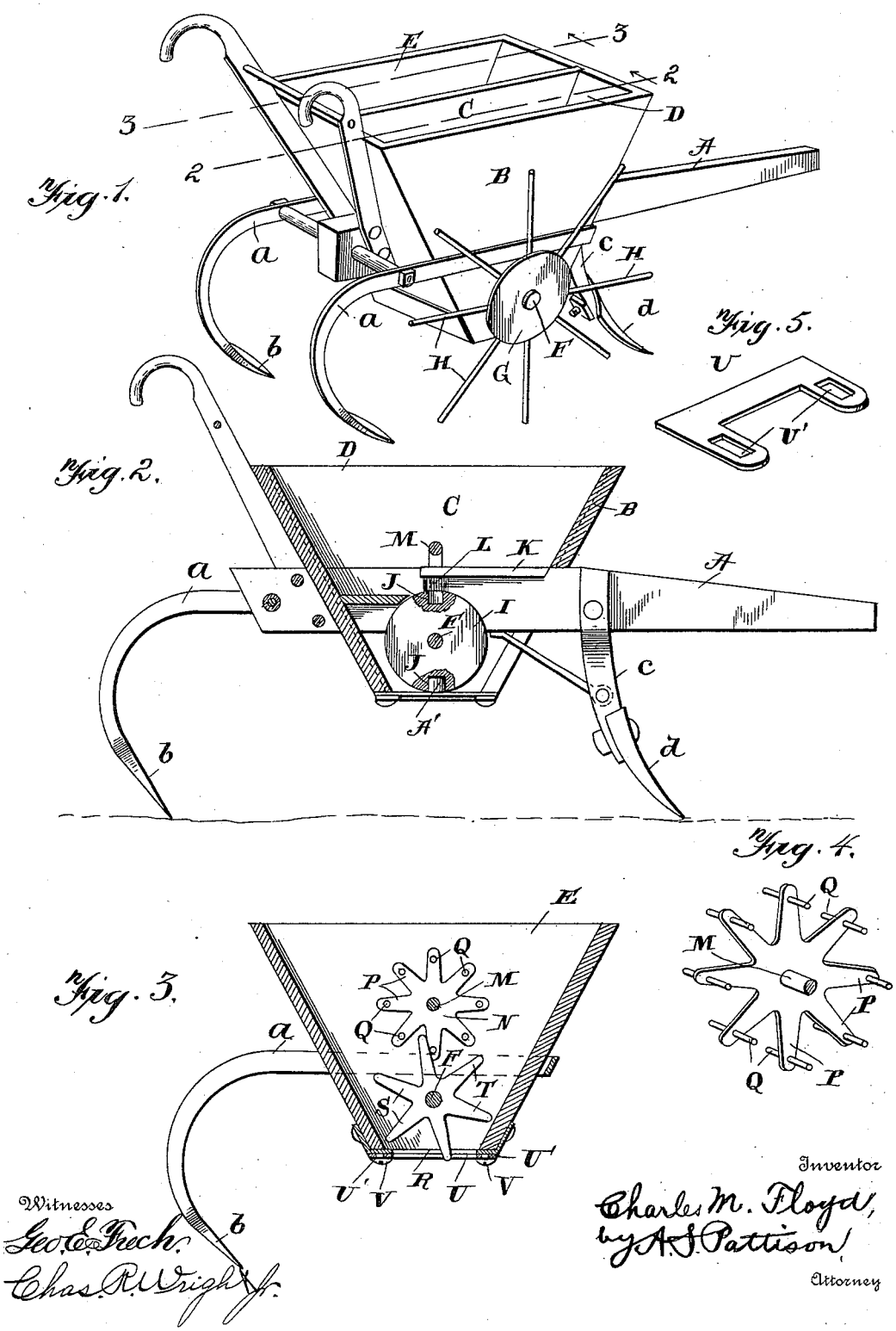

UNITED STATES PATENT OFFICE.

CHARLES M. FLOYD, OF AUBURN, ALABAMA.

COMBINED PLANTER AND FERTILIZER-DISTRIBUTER.

SPECIFICATION forming part of Letters Patent No. 632,179, dated August 29, 1899.

Application filed June 5, 1899. Serial No. 719,458. (No model.)

*To all whom it may concern:*

Be it known that I, CHARLES M. FLOYD, a citizen of the United States, residing at Auburn, in the county of Lee and State of Alabama, have invented new and useful Improvements in a Combined Planter and Fertilizer-Distributer, of which the following is a specification.

My invention relates to improvements in combined planters and fertilizer-distributers; and it consists in the construction and arrangement of parts, which will be fully described hereinafter and particularly pointed out in the claims.

In the accompanying drawings, Figure 1 is a perspective view of a planter and fertilizer-distributer embodying my invention. Fig. 2 is a longitudinal vertical sectional view taken on line 2 2 of Fig. 1. Fig. 3 is a similar view taken on line 3 3 of Fig. 1, looking in the direction indicated by arrow. Fig. 4 is a detached view of the fertilizer-stirrer wheel. Fig. 5 is a detached view of the adjustable plate U.

Referring now to the drawings, A indicates a beam which passes through a hopper B. This hopper is divided vertically by a partition C, which provides a seed-compartment D and a fertilizer-compartment E. Passing through the lower end of the hopper and journaled therein below the beam A is a feeder-shaft F, this feeder-shaft carrying at one or, if preferred, at both ends a disk G, provided with radially-projecting arms H, which serve to rotate the feed-shaft by coming in contact with the ground as the machine is drawn along.

Secured to the feed-shaft F is a feed-disk I, provided with a plurality of openings J in the periphery thereof, and this wheel serves to close a portion of the bottom of the compartment E. Situated at a point in front of the axes of this feed-disk is a board K, which serves also as a part of the bottom of the compartment E, and this board is situated at a point above and out of contact with the feed-disk. Secured to the under side of the board K is a brush L, adapted to engage the periphery or feeding-face of the disk, the object of which is to brush off all of the seeds which are not contained within the feed-cavities of the disk, and thus serve to feed only that amount of seed which is contained in the cavities, as is well understood by those skilled in the art.

Journaled within the upper end of the hopper and passing through the division-board C thereof is a shaft M, which is provided within the compartment E with a disk N, provided with radial arms P, and passing through each of these radial arms are the stirring and actuating rods Q.

The bottom of the fertilizer-distributer compartment E is closed by a plate R, having a slot through which the radial arms S of a wheel T, carried by the feed-shaft F, slightly project. This feed-wheel serves to feed the fertilizer through the said slit in the plate at the bottom of the compartment, and the size of this slit is regulated by means of a U-shaped adjustable plate U, having in the end thereof the slots U′, through which the clamping-screws V pass. By means of this arrangement the amount of fertilizer being fed can be readily and easily regulated.

In operation as the machine is drawn along the feed-shaft is rotated, as before explained, and the stirrer-shaft is revolved by means of the arms H upon the feed-shaft, which engage one end of the pins Q, which pass through the arms of the disk N. This arrangement enables the pins to serve the double function of cog-pins and also as stirrers, and the arms to which the pins are attached also serve as stirrers and not only stir and agitate the fertilizer, but serve to force it down into the lower end of the hopper to be fed out by the feed-disk.

Secured to the beam A at their forward ends are the cultivator or covering beams $a$, which carry at their rear ends the covering blades or plows $b$, and secured to the beam A in front of the hopper is a plow or opener-stock $c$, to which an opener $d$ is secured in any suitable manner. In practice this opener will form a furrow into which the seed and fertilizer are dropped, and the covering-blades $b$ serve to cover both the seed and the fertilizer, as is usual in planting-machines.

A fertilizer-stirrer of the construction herein shown and described is simple and yet very effective, the feed-disk serving the double function of feeding and stirring and the transverse pins in the arms of the stirrer-disk serving the double function of cog-pins and of stirrers.

Thus far I have described my invention as being adapted for a combined fertilizer-distributer and planter; but I do not limit myself to this particular use of the invention. For instance, the division-board can be removed and the openings in the feed-wheel filled up with rubber stoppers A', which will prevent the wheel from feeding. In this condition the invention is adapted to be used for planting cotton-seed and drilling oats and wheat. The wheel which acts as a fertilizer-distributer will in this event serve to feed through the cotton-seed, wheat, or oats, as the case may be. The invention is therefore adapted for feeding smooth seed and simultaneously distributing fertilizer from opposite sides or compartments, and it is also adapted for drilling wheat, cotton-seed, and oats, and in this event the division-board may be removed or not, according to the quantity of seed it is desired to have the machine contain.

Having thus described my invention, what I claim, and desire to secure by Letters Patent, is—

1. A combined planter and fertilizer-distributer comprising a hopper having two vertical compartments, a transverse driving-shaft passing through the lower ends of said compartments, said shaft having a feed-wheel at the bottom of the seed-compartment, a fertilizer-feed wheel situated wholly within the fertilizer-compartment, the fertilizer-compartment having a longitudinal feeding-slot in the bottom thereof, a fertilizer-stirrer journaled above the said fertilizer-feed wheel, the stirrer and feed-wheel provided with radial arms, the lower side of the feed-wheel passing through the said feeding-slot and the upper side of the feed-wheel engaging the arm of the said stirrer, whereby the lower side of the feed-wheel feeds the fertilizer and the upper side operates the stirrer thereabove, substantially as described.

2. A combined fertilizer-distributer and planter comprising a hopper divided into two vertical compartments, one forming a seed-compartment and the other a fertilizer-compartment, a feed-shaft passing through the hopper at the lower end of the said compartments, a seed-feeding disk carried by the shaft in the seed-compartment, a fertilizer-feeding disk carried by said shaft in the lower end of the fertilizer-compartment, said feeding-wheel provided with radially-projecting arms, serving as a cog-wheel and as feeding-arms, and a fertilizer-stirrer situated in the upper portion of the fertilizer-compartment, said stirrer comprising a rotating member having radially-extending arms, the radially-extending arms provided with laterally-extending pins projecting transverse the hopper and forming cogs with which the fertilizer-feed-wheel arms engage, substantially as described.

3. A combined fertilizer and planter comprising a hopper divided into vertical compartments, one for seed and the other for fertilizer, a feed-shaft passing through the lower end of the compartments and provided with a projecting end carrying radial arms adapted to engage the ground for rotating the shaft, a seed-disk carried by the shaft within the lower end of said compartment, a fertilizer-feeding wheel carried by said shaft in the lower end of the fertilizer-compartment, said feed-wheel having radially-projecting arms, the fertilizer-compartment having its bottom provided with a feeding-slot into which the lower side of said arm projects, and a stirrer-wheel journaled in the upper portion of the fertilizer-compartment at a point intermediate the side thereof, and having laterally-extending arms projecting from opposite sides thereof and transverse the said compartment, the arms of the fertilizer-feed wheel engaging with the said transversely-extending pins of the stirrer, substantially as described.

In testimony whereof I have hereunto set my hand in the presence of two subscribing witnesses.

CHARLES M. FLOYD.

Witnesses:
J. T. CRAWFORD,
W. P. ZUBER.